US008785507B2

(12) United States Patent
Bloomfield

(10) Patent No.: US 8,785,507 B2
(45) Date of Patent: Jul. 22, 2014

(54) VISCOELASTIC SILICON RUBBER COMPOSITIONS

(75) Inventor: Louis A. Bloomfield, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 0 days.

(21) Appl. No.: 13/583,397

(22) PCT Filed: Mar. 9, 2011

(86) PCT No.: PCT/US2011/027720
§ 371 (c)(1),
(2), (4) Date: Sep. 7, 2012

(87) PCT Pub. No.: WO2011/112699
PCT Pub. Date: Sep. 15, 2011

(65) Prior Publication Data
US 2012/0329896 A1 Dec. 27, 2012

Related U.S. Application Data

(60) Provisional application No. 61/312,049, filed on Mar. 9, 2010.

(51) Int. Cl.
*C08G 79/08* (2006.01)
*C08G 77/06* (2006.01)

(52) U.S. Cl.
USPC ........... 521/52; 521/85; 521/86; 521/154; 528/8; 528/34; 528/39

(58) Field of Classification Search
None
See application file for complete search history.

(56) References Cited

U.S. PATENT DOCUMENTS

| | | |
|---|---|---|
| 2,084,261 A | 6/1937 | Boughton et al. |
| 2,258,218 A | 10/1941 | Rochow |
| 2,258,219 A | 10/1941 | Rochow |
| 2,258,220 A | 10/1941 | Rochow |
| 2,258,221 A | 10/1941 | Rochow |
| 2,258,222 A | 10/1941 | Rochow |
| 2,371,068 A | 3/1945 | Rochow |
| 2,375,998 A | 5/1945 | McGregor et al. |
| 2,384,384 A | 9/1945 | McGregor et al. |
| 2,431,878 A | 12/1947 | McGregor et al. |
| 2,440,101 A | 4/1948 | Krieble |
| 2,442,613 A | 6/1948 | Nicodemus |
| 2,459,387 A | 1/1949 | McGregor et al. |
| 2,460,116 A | 1/1949 | Bazley |
| 2,517,945 A | 8/1950 | Upson |
| 2,541,851 A | 2/1951 | Wright |
| 2,602,327 A | 7/1952 | Bond |
| 2,606,611 A | 8/1952 | Max |
| 2,609,201 A | 9/1952 | Martin |
| 2,610,167 A | 9/1952 | Grotenhuis |
| 2,644,805 A | 7/1953 | Martin |
| 2,704,663 A | 3/1955 | Blake |
| 2,721,857 A | 10/1955 | Dickmann |
| 2,743,515 A | 5/1956 | Davis |
| 2,756,016 A | 7/1956 | Warren |
| 2,791,788 A | 5/1957 | Hausdorf |
| 2,796,765 A | 6/1957 | Hnston |
| 2,842,521 A | 7/1958 | Nitzsche |
| 2,871,616 A | 2/1959 | Sundell |
| 2,957,900 A | 10/1960 | Groszos |
| 2,983,697 A | 5/1961 | Brown |
| 3,050,490 A | 8/1962 | Nitzsche |
| 3,050,491 A | 8/1962 | Nitzsche |
| 3,070,559 A | 12/1962 | Nitzsche |
| 3,070,560 A | 12/1962 | Metevia |
| 3,070,567 A | 12/1962 | Nitzsche |
| 3,154,520 A | 10/1964 | Dupont |
| 3,177,176 A | 4/1965 | Boot |
| 3,197,319 A | 7/1965 | Wright |
| 3,213,048 A | 10/1965 | Boot |
| 3,230,121 A | 1/1966 | Nitzsche |

(Continued)

FOREIGN PATENT DOCUMENTS

| | | |
|---|---|---|
| CA | 588913 | * 12/1959 |
| GB | 797974 | 7/1958 |

(Continued)

OTHER PUBLICATIONS

International Search Report for PCT/US2012/050419, dated Jan. 11, 2013.*
Preliminary Report on Patentability for PCT/US2012/050419, dated Feb. 11, 2014.*
"Ceramic Precursor in Flame Retardant Systems" authored by Marosi et al. and published in Polymer Degradation in Flame Retardant Systems (2002) 259-265.*

(Continued)

*Primary Examiner* — Marc Zimmer
(74) *Attorney, Agent, or Firm* — J.A. Lindeman & Co., PLLC

(57) ABSTRACT

This invention relates to viscoelastic silicone rubber compositions that are the products of the reaction of: (a) a silanol-terminated polyorganosiloxane base; (b) a boron-containing crosslinking agent; and (c) a siloxane bond-forming crosslinking agent. In a viscoelastic silicone rubber composition of the invention some of the crosslinks, the siloxane crosslinks, are permanent and others of the crosslinks, the boron-containing crosslinks, are temporary. Because a fraction of its crosslinks can come apart and then reform, a viscoelastic silicone rubber composition of the invention can relax stress in response to strain and thus adapt to new shapes. The composition has sufficient permanent crosslinks, however, to establish a permanent equilibrium shape to which the composition will eventually return when not subject to any imposed stress. A viscoelastic silicone rubber composition has sufficient temporary crosslinks to give the composition a stiffness that is greater on short timescales than it is on longer timescales.

8 Claims, 1 Drawing Sheet

(56) References Cited

U.S. PATENT DOCUMENTS

| | | | |
|---|---|---|---|
| 3,231,542 A | 1/1966 | Eisinger |
| 3,294,612 A | 12/1966 | Pail |
| 3,296,182 A | 1/1967 | Fekete |
| 3,330,797 A | 7/1967 | Kelly |
| 3,350,344 A | 10/1967 | Beers |
| 3,357,684 A | 12/1967 | Kunnen |
| 3,379,607 A | 4/1968 | Foster |
| 3,382,511 A | 5/1968 | Brooks |
| 3,415,778 A | 12/1968 | Burzynski et al. |
| 3,600,351 A | 8/1971 | Hunt |
| 3,629,183 A | 12/1971 | Proriol |
| 3,661,790 A | 5/1972 | Dean |
| 3,677,997 A | 7/1972 | Kaiser |
| 3,772,240 A | 11/1973 | Greenlee |
| 3,855,171 A | 12/1974 | Wegehaupt |
| 3,862,919 A | 1/1975 | Nitzsche |
| 3,969,309 A | 7/1976 | Wright |
| 4,054,714 A | 10/1977 | Mastrangelo |
| 4,180,642 A | 12/1979 | Takago |
| 4,339,339 A | 7/1982 | Maciejewski |
| 4,371,493 A | 2/1983 | Minuto |
| 4,381,491 A | 4/1983 | Vogelgesang |
| 4,667,007 A | 5/1987 | Wengrovius et al. |
| 5,042,765 A | 8/1991 | Widerstrom |
| 5,125,191 A | 6/1992 | Rhoades |
| 5,258,068 A | 11/1993 | Shapero et al. |
| 5,310,421 A | 5/1994 | Shapero et al. |
| 5,319,021 A | 6/1994 | Christy |
| 5,364,693 A | 11/1994 | Moren et al. |
| 5,391,336 A | 2/1995 | Akitomo et al. |
| 5,446,075 A | 8/1995 | Gibbon |
| 5,472,994 A | 12/1995 | Micallef et al. |
| 5,498,640 A | 3/1996 | Witt et al. |
| 5,502,144 A | 3/1996 | Kuo et al. |
| 5,507,866 A | 4/1996 | Drew et al. |
| 5,580,917 A | 12/1996 | Maciejewski et al. |
| 5,607,993 A | 3/1997 | Christy |
| 5,786,578 A | 7/1998 | Christy et al. |
| 5,869,164 A | 2/1999 | Nickerson et al. |
| 5,873,933 A | 2/1999 | Mackey |
| 6,127,457 A | 10/2000 | Darling |
| 6,242,373 B1 | 6/2001 | Mangold et al. |
| 6,287,372 B1 | 9/2001 | Briand et al. |
| 6,391,941 B1 | 5/2002 | Williams |
| 6,613,440 B2 * | 9/2003 | Hara et al. ............ 428/447 |
| 6,623,791 B2 | 9/2003 | Sadvary et al. |
| 6,701,529 B1 | 3/2004 | Rhoades et al. |
| 7,381,460 B2 | 6/2008 | Palmer et al. |
| 7,393,879 B1 | 7/2008 | Kresta et al. |
| 7,658,972 B2 | 2/2010 | Matsumura |
| 8,032,236 B2 * | 10/2011 | Stephenson et al. ............ 700/33 |
| 8,129,293 B2 * | 3/2012 | Budden et al. ................ 442/140 |
| 2002/0086168 A1 | 7/2002 | Sadvary et al. |
| 2003/0069351 A1 | 4/2003 | Kishihara et al. |
| 2004/0072653 A1 | 4/2004 | Minuto et al. |
| 2004/0082886 A1 | 4/2004 | Timpson |
| 2004/0171321 A1 | 9/2004 | Plant |
| 2005/0037189 A1 | 2/2005 | Palmer et al. |
| 2005/0209400 A1 | 9/2005 | Tsumura et al. |
| 2005/0282450 A1 | 12/2005 | Sauer et al. |
| 2006/0243947 A1 | 11/2006 | Tsumura et al. |
| 2007/0029690 A1 | 2/2007 | Green et al. |
| 2007/0105977 A1 | 5/2007 | Gabriel et al. |
| 2007/0152117 A1 | 7/2007 | Byrd |
| 2009/0324927 A1 | 12/2009 | Palmer et al. |
| 2010/0132099 A1 | 6/2010 | Green |

FOREIGN PATENT DOCUMENTS

| | | |
|---|---|---|
| GB | 859284 | 1/1961 |
| GB | 947847 | 1/1964 |
| GB | 974305 | 11/1964 |
| GB | 989409 | 4/1965 |
| GB | 1069584 | 5/1967 |
| JP | 54084000 | 7/1979 |
| JP | 62277475 | 12/1987 |
| JP | 02-269157 | 11/1990 |
| JP | 10195381 | 7/1998 |
| WO | 85/02854 A1 | 7/1985 |
| WO | 2009/129179 A1 | 10/2009 |
| WO | 2009/131838 A1 | 10/2009 |
| WO | 2011/112699 A1 | 9/2011 |
| WO | 2013/023174 A1 | 2/2013 |

OTHER PUBLICATIONS

Wick, "Bor-Siloxan-Elastomere," Kunststoffe Bd. 50 Heft 8, pp. 433-436 (1960).
Google translation of Wick, "Bor-Siloxan-Elastomere," Kunststoffe Bd. 50 Heft 8, pp. 433-436 (1960).
English-language abstract of JP 02-269157.
English-language abstract of JP 10195381.
English-language abstract of JP 54084000.
English-language abstract of JP 62277475.
International Search Report and Written Opinion for the International Searching Authority for WO 2011/112699 dated May 16, 2011.
Flory, "Constitution of Three-Dimensional Polymers and the Theory of Gelation," J. Phys. Chem. 46:132-140 (1942).
Stockmayer, "Theory of Molecular Size Distribution and Gel Formation in Branched-Chain Polymers," J. Chem. Phys. 11(2):45-55 (1943).

* cited by examiner

VISCOELASTIC SILICON RUBBER COMPOSITIONS

CROSS-REFERENCE TO RELATED APPLICATIONS

This application claims priority to PCT International Application No. PCT/US2011/027720, filed Mar. 9, 2011; which claims priority to U.S. Application No. 61/312,049, filed Mar. 9, 2010, which are incorporated herein by reference.

BACKGROUND OF THE INVENTION

Soon after Rochow invented polyorganosiloxanes or "silicones" (U.S. Pat. Nos. 2,258,218-2,258,222), McGregor discovered that heating boric acid together with silicones produced a viscoelastic fluid that became known as "bouncing putty" (U.S. Pat. No. 2,431,878). This remarkable fluid rebounds almost perfectly when dropped on a hard surface yet, like any fluid, it has no fixed shape. More specifically, bouncing putty responds elastically to sudden impacts, but flows slowly in response to prolonged stresses. Bouncing putty has a viscosity that increases with rate of shear, so it is a shear-thickening fluid or, equivalently, a dilatant fluid.

Since its discovery, bouncing putty has been improved and modified in a number of ways. Wright (U.S. Pat. No. 2,541,851) added a filler such as zinc hydroxide to the putty to improve its bounce. Martin (U.S. Pat. No. 2,644,805) showed that bouncing putty can be formed from boric acid and tetramethyl disiloxane diol-1,3. Boot (U.S. Pat. No. 3,177,176) found that adding silica reinforcing filler to the silicones before adding the boron compounds caused the bouncing putty to form more quickly and at a lower temperature during the subsequent heating step. Boot (U.S. Pat. No. 3,213,048) discovered that bouncing putty can be formed at room temperature by adding alkyl borates to silanol-terminated polydimethylsiloxanes (PDMS).

Beers (U.S. Pat. No. 3,350,344) found that adding an ammonium carbonate salt to bouncing putty prevents the putty from flowing under the stress of its own weight and from staining fabrics. Dean (U.S. Pat. No. 3,661,790) prepared glowing bouncing putty by adding activated zinc sulfide and also reduced the putty's density by incorporating small transparent spheres. Kaiser (U.S. Pat. No. 3,677,997) added polyglycols to bouncing putty and thereby reduced its tendency to become tacky upon extended kneading or use. Mastrangelo (U.S. Pat. No. 4,054,714) discloses that adding noble metal particles to bouncing putty renders that putty electrically conducting. Minuto (U.S. Pat. No. 4,371,493) discloses a method for producing bouncing putty from a dimethyl silicone gum, a boron compound, and a reinforcing filler. Christy (U.S. Pat. No. 5,319,021) added discrete elastic particles to bouncing putty to obtain a material that largely recovers its initial form when a deforming stress is removed. Christy (U.S. Pat. No. 5,607,993) subsequently added thermoplastic microspheres to bouncing putty to reduce its average density to approximately 0.6 g/cc.

Bouncing putty is not, however, the only example of boron being added to silicones. Rochow (U.S. Pat. No. 2,371,068) employed boric acid esters as dehydrating agents for silicols. Nicodemus (U.S. Pat. No. 2,442,613) added boric acid or an organic borate to a heat-hardenable silicone to prevent copper from corroding when the silicone is vulcanized onto that copper. McGregor (U.S. Pat. No. 2,459,387) employed boron trifluoride as a dehydrating agent. Upson (U.S. Pat. No. 2,517,945) combined a silanediol with a boronic acid to obtain a thermoplastic copolymer, but noted no unusual viscoelastic properties in the finished copolymer. Dickmann (U.S. Pat. No. 2,721,857) found that adding 0.005 to 0.090 wt % boron compound to unvulcanized silicone elastomer stock improved the handling of that stock and reduced its stickiness, but teaches that "when the boron compound is present in an amount exceeding the upper limit set forth above [0.090 wt %], the physical properties of the resulting silicone elastomer are seriously impaired."

Nitzsche (U.S. Pat. No. 2,842,521) found that boric acid hydroxyl complexes act as catalysts for the curing of organosiloxane resins, but noted no unusual viscoelastic properties in the finished polymer. Brown (U.S. Pat. No. 2,983,697) added 0.01 to 0.16 wt % boron as tris-triorganosilyl-borates to silicone elastomers to retard crepe hardening, but teaches that "When the amount of boron is greater than 0.16 part per 100 parts of siloxane . . . , the additional boron . . . degrades other physical properties."

Nitzsche (U.S. Pat. No. 3,050,490) disclosed that adding boron nitride to hydroxyl enblocked polymeric dimethylsiloxane gum, forming the mixture into a tape, and pre-vulcanizing that mixture resulted in a self-adhering tape that could be wound on an object and vulcanized into a homogeneous, unitary tube. Nitzsche (U.S. Pat. No. 3,050,491) disclosed that adding 0.001 to 0.1 wt % boric acid or alkyl borates produced self-adhering material, but teaches that "Larger quantities of boron compound impede the vulcanization and depress the physical properties of the ultimate rubber." Nitzsche (U.S. Pat. No. 3,070,559) discloses crosslinking agents that can be used to make silicone rubbers and includes without comment in a long list of compounds "esters of boric acid." Nitzsche (U.S. Pat. No. 3,070,567) then discloses that incorporating 0.1 to 10 wt % of a complex compound of boric acid and a polyhydric alcohol in a silicone base can yield self-adhering tapes that stick to themselves only at elevated temperature.

In a patent on self-adhering silicone rubber, Nitzsche (U.S. Pat. No. 3,230,121) discloses the use of boron-containing self-adhering silicone rubber insulating tape to protect hollow glass articles. He notes that "The silicone rubbers of the present discovery possess the surprising property that the more violent the blow, the greater will be the rebound elasticity. They possess this property in common with the above-mentioned 'bouncing putty,' to which they are chemically related." Nitzsche's comment is made in the context of protecting glassware from impact and is not generalized to any other purpose. Moreover, the silicone rubbers Nitzsche employed in U.S. Pat. No. 3,230,121 are themselves prior art and Nitzsche provides a comprehensive list of prior art patents. The most recent of those prior art patents is Nitzsche's own work: U.S. Pat. No. 3,050,491 (listed in U.S. Pat. No. 3,230,121 as "Serial No. 9,428, filed Feb. 18, 1960"). In U.S. Pat. No. 3,050,491, Nitzsche teaches against using more than 0.1 wt % boron compounds in silicone elastomers.

Eisinger (U.S. Pat. No. 3,231,542) discloses boron-containing self-adhering silicone rubbers with improved surface characteristics. Fekete (U.S. Pat. No. 3,296,182) incorporates approximately 0.35 wt % boric acid to silicones, along with a titanium compound, to obtain pressure-sensitive adhesive elastomers. Kelly (U.S. Pat. No. 3,330,797) discloses additional boron-containing self-adhering silicone elastomers. Foster (U.S. Pat. No. 3,379,607) added boron compounds to silicones to promote adhesion to surfaces. Proriol (U.S. Pat. No. 3,629,183) discloses boron-containing silicones that vulcanize to form adhesive elastomers on heating. Greenlee (U.S. Pat. No. 3,772,240) found that adding boric acid to silicones improved their adhesion to metals. Wegehaupt (U.S.

Pat. No. 3,855,171) incorporates pyrogenically produced mixed oxides of boron and an element selected from the class consisting of silicon, aluminum, titanium and iron in silicones for the purposes of preparing either self-adhering elastomers or bouncing putty.

Maciejewski (U.S. Pat. No. 4,339,339) recognizes that bouncing putty's bounciness makes it unable to absorb energy during sudden impacts. He discloses a boron-containing, non-vulcanizable silicone for use for hydrostatic damping and shock absorption that is able to absorb energy during impacts because it does not exhibit the unusual resiliency of bouncing putty.

SUMMARY OF THE INVENTION

This invention relates to viscoelastic silicone rubber compositions that are the products of the reaction of: (a) a silanol-terminated polyorganosiloxane base; (b) a boron-containing crosslinking agent; and (c) a siloxane bond-forming crosslinking agent. In a silicone rubber composition of the invention some of the crosslinks, the siloxane crosslinks, are permanent and others of the crosslinks, the boron-containing crosslinks, are temporary. Because a fraction of its crosslinks can come apart and then reform, a viscoelastic silicone rubber composition of the invention can relax stress in response to strain and thus adapt to new shapes. The composition has sufficient permanent crosslinks, however, to establish a permanent equilibrium shape to which the composition will eventually return when not subject to any imposed stress. A viscoelastic silicone rubber composition has sufficient temporary crosslinks to give the composition a stiffness that is greater on short timescales than it is on longer timescales.

DESCRIPTION OF THE INVENTION

This invention relates to viscoelastic silicone rubber compositions that are the products of the reaction of: (a) a silanol-terminated polyorganosiloxane base; (b) a boron-containing crosslinking agent; and (c) a siloxane bond-forming crosslinking agent. Each of these components is discussed below. In a viscoelastic silicone rubber composition of the invention, the siloxane bond-forming crosslinking agent is present in an amount sufficient to give the viscoelastic silicone rubber composition an equilibrium shape. In other words, the amount of siloxane, —Si—O—Si—, crosslinks resulting from the siloxane-bond forming crosslinking agent is sufficient to make the rubber composition a solid.

In a viscoelastic silicone rubber composition of the invention some of the crosslinks, the siloxane crosslinks, are permanent and others of the crosslinks, the boron-containing crosslinks, are temporary. Because a fraction of its crosslinks can come apart and then reform, a viscoelastic silicone rubber composition of the invention can relax stress in response to strain and thus adapt to new shapes. The composition has sufficient permanent crosslinks, however, to establish a permanent equilibrium shape to which the composition will eventually return when not subject to any imposed stress. A viscoelastic silicone rubber composition has sufficient temporary crosslinks to give the composition a stiffness that is greater on short timescales than it is on longer timescales. If a force is quickly applied to a viscoelastic silicone rubber composition, it feels relatively stiff and undergoes relatively little strain. If the force is applied for a longer time, however, the composition feels relatively soft and undergoes relatively substantial strain. Furthermore, the composition possesses a resilience during impact that increases with the speed of that impact. When the composition is struck sharply, it exhibits enhanced stiffness and undergoes particularly little strain. Moreover, the composition stores the work done on its surface efficiently and returns nearly all of that work during the rebound.

Figure 1:
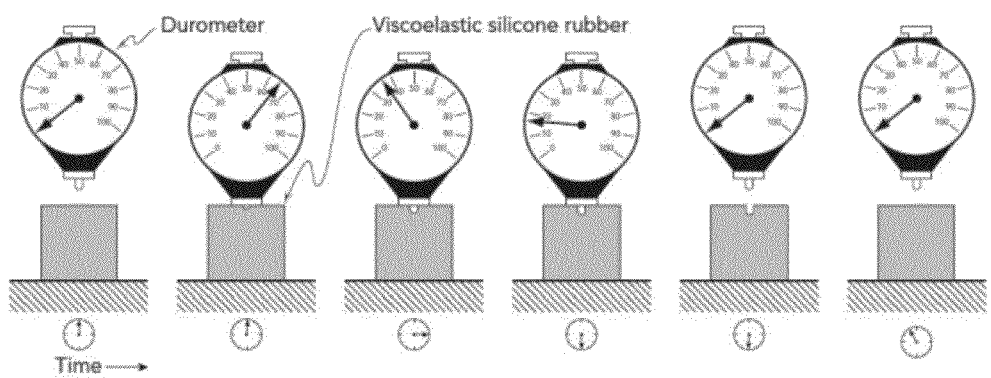
FIG. 1 shows how a viscoelastic silicone rubber composition of the invention exhibits a Shore Hardness that decreases significantly as the duration of the measurement increases. As shown, when a Shore durometer is pressed against the surface of the rubber, the immediate reading of the durometer is significantly greater than the reading of that same durometer after it has been in place for 60 seconds.

The viscoelastic silicone rubber compositions of the invention are a broad class of compounds that include dense materials, foamed materials, comminuted materials, and materials that can be molded and even incorporated in other known materials to form blended materials and composite materials. These materials are solids in that they have equilibrium shapes to which they return in the absence of imposed stresses, but they exhibit time-dependent stiffnesses: they are stiffer at short timescales than they are at long timescales. A viscoelastic silicone rubber composition of the invention exhibits a Shore Hardness that decreases significantly as the duration of the measurement increases. For example, as shown in FIG. 1, when a Shore durometer is pressed against the surface of the rubber, the immediate reading of the durometer is significantly greater than the reading of that same durometer after it has been in place for 60 seconds. In other words, a viscoelastic silicone rubber composition has a greater Shore Hardness at time zero, t=0, than it does after 60 seconds, t=60 seconds.

Conventional silicone rubber is a solid formed when individual chain-like polyorganosiloxane molecules (silicones) are crosslinked together into an extensive network. The crosslinks have little effect on the short-range mobilities of the individual molecular chains since those chains can still slide across one another at room temperature. However, the crosslinks severely limit the long-range mobilities of those chains. The vast network of linkages, loops, and tangles present in a heavily crosslinked silicone material give that material a fixed equilibrium shape and render it a solid.

Prior to crosslinking, a base material consisting of countless individual silicone chains is liquid at room temperature, although it may be quite viscous. In general, the higher the average molecular weight of the individual silicone molecules, the more viscous the liquid. As the extent of crosslinking increases, the average molecular weight of the individual silicone molecules increases and branching develops—three or more silicone chains meeting at a single molecular junction. Loops and tangles also develop in the collection of crosslinked chains.

When the extent of crosslinking exceeds a certain level, the silicone "gels"—it becomes a soft, fragile solid. The network of crosslinked silicone chains is then so extensive that macroscopic regions of the material are spanned by crosslinked molecules and these molecules have limited mobility. To form a robust silicone rubber, however, crosslinking must continue beyond the gel point. With additional crosslinking, the silicone rubber becomes stiffer and stronger, but it also becomes less able to adopt substantially different shapes. There is a trade-off between the crosslinked silicone's tendency to maintain a specific equilibrium shape and its ability to adopt other shapes in response to stresses. Thus a highly crosslinked silicone rubber is very stiff and it resists deformation. When a silicone rubber is strained beyond its elastic limit, that rubber tears. To improve their tear strengths, virtually all conventional silicone rubbers contain reinforcing fillers such as fumed silica.

The viscoelastic silicone rubber compositions of this invention are also crosslinked structures but differ from conventional silicone rubber compositions. The silicone rubber compositions of the invention include some crosslinks that are temporary rather than permanent. In a conventional silicone rubber, all of the crosslinks are permanent. A "permanent crosslink" is one that is unlikely to come apart at ordinary temperatures (generally <100° C.) in an ordinary amount of time (generally <1 day). Because all of its crosslinks are permanent, a fully cured conventional silicone rubber exhibits virtually no time evolution, e.g., deformation over time. When subject to constant strain, a fully cured conventional silicone rubber responds with constant stress and acts to return itself to its original equilibrium shape no matter how long that strain continues. The relationship between stress and strain in a conventional silicone rubber resembles that of an ordinary spring and is approximately time-independent.

In the viscoelastic silicone rubber compositions of this invention, some of crosslinks are temporary. A "temporary crosslink" is a crosslink that has a significant probability of coming apart at ordinary temperatures (<100° C.) in an ordinary amount of time (<1 day). One example of a temporary crosslink between two separate silicone chains is a silicon-oxygen-boron-oxygen-silicon bridge that connects two silicon atoms in separate silicone chains by way of the boron atom. These chemical bonds have a substantial probability of coming apart at ordinary temperatures in an ordinary amount of time, particularly when there are water, alcohol, and/or carboxylic acid molecules present in the material. Once a temporary crosslink has come apart, the boron moiety becomes chemically active again and can attach itself to a different silicone chain or to the same silicone chain but after a time when the temporary crosslink has been broken. For simplicity, and merely to illustrate this while not being bound to this theory, a temporary crosslink can "open" (detach from one or more silicone chains) and "close" (attach to one or more silicone chains) in a relatively short amount of time (e.g., in milliseconds, seconds, minutes, or hours). The rate at which the temporary crosslinks open and close may depend on temperature and the chemical environment near those crosslinks.

Because some of its crosslinks are temporary, a fully cured viscoelastic silicone rubber of this invention exhibits time evolution. When subject to a strain that appears suddenly and then remains constant, the material initially responds with constant stress. On short timescales, the material's stiffness depends on both the permanent and temporary crosslinks. But as the material's temporary crosslinks open and close, its network structure evolves and its stress relaxes. At long time scales, in the limit of infinite time, the temporary crosslinks relax completely and thus do not contribute to the material's stress. Since the permanent crosslinks cannot relax, they continue to contribute to the material's stress indefinitely. On long timescales, the material's stiffness and shape depend only on the permanent crosslinks.

The temporary crosslinks remain important in the strained but relaxed viscoelastic silicone rubber. The temporary crosslinks do not simply open during the relaxation process; they close to form new and different temporary crosslinks. When the strain is suddenly removed from the material, the formation of new temporary crosslinks produces stress in the material. In effect, the strained material gradually adapted to its new strained shape and it acts to oppose a sudden return to its original equilibrium shape. This new stress gradually relaxes as the temporary crosslinks open and close, until, over a long time scale, in the limit of infinite time, the unstrained material becomes once again free of stress and returns to its original shape.

It is useful to view a viscoelastic silicone rubber of this invention as having two overlapping and possibly interconnected networks: one permanent and the other temporary. The permanent network has a fixed topology and gives the material a permanent equilibrium shape—the shape to which it will return when free of imposed stress for a sufficient period of time. When the material is subject to constant strain, that permanent network produces a constant stress. The temporary network, however, has a topology that evolves with time and it relaxes so as to eliminate stress.

When a viscoelastic silicone rubber has been free of strain for a sufficient time, the material adopts its equilibrium shape and both of the permanent and temporary networks are free of stress. The overall material is then free of both stress and strain.

Viscoelastic silicone rubber compositions of the invention exhibit time-dependent responses to sudden changes in strain. When an unstressed, unstrained viscoelastic silicone rubber composition of the invention is subject to a sudden strain which then remains constant, its permanent crosslink network responds with a stress that rises suddenly and then remains constant. In contrast, the material's temporary network responds with a stress that rises suddenly and then relaxes, ultimately to zero. When the strained but relaxed material is suddenly returned to zero strain and then remains at zero strain, its permanent network responds with stress that drops suddenly to zero and remains at zero. The material's temporary network, however, responds once more with a stress that rises suddenly and then relaxes to zero. In other words, the permanent network acts to return the material to its equilibrium shape while the temporary network acts to oppose any rapid change in the material's shape.

Viscoelastic silicone rubber compositions of the invention also exhibit time-dependent responses to sudden changes in stress. When an unstressed, unstrained viscoelastic rubber composition of the invention is subject to a sudden stress that then remains constant, both its permanent and temporary network oppose the stress and the material responds with a small strain. The temporary network, however, gradually relaxes its opposition to the stress so that the material's strain increases with time. Eventually, only the permanent network is opposing the stress and the material reaches a constant large strain.

When the stressed but relaxed material is suddenly returned to zero stress and then remains at zero stress, the two networks oppose one another. The permanent network acts to return the material to its equilibrium shape, but the temporary network has adapted to the new shape and acts to oppose the return to material's equilibrium shape. The temporary network, once more, gradually relaxes (the temporary crosslinks open and reform) its opposition and allows the material to return to its equilibrium shape.

To be a solid (i.e., to have a permanent equilibrium shape), any silicone rubber must have enough permanent crosslinks to connect the individual silicone chains into macroscopic networks, so that topology and tangles forever dictate that material's shape. The viscoelastic silicone rubber compositions of this invention are no exception: they must have sufficient permanent crosslinks to establish a permanent equilibrium shape. The viscoelastic rubber compositions of the invention may be formed into a wide variety of shapes and using the same techniques as with conventional silicone rubbers. Typically, as is known in the art, a silicone rubber is shaped by placing an uncured liquid silicone composition into a mold and then crosslinking that composition into a solid rubber.

Once a minimum amount of permanent crosslinking has been reached, however, additional crosslinks in a viscoelastic rubber composition of the invention may include further permanent crosslinks or may be all temporary crosslinks. Additional permanent crosslinks increase both the short timescale and long timescale stiffnesses of the silicone rubber, while additional temporary crosslinks increase only the short timescale stiffness of a viscoelastic silicone rubber composition of the invention.

One common approach to forming crosslinks is to add a crosslinking agent, often in the presence of one or more catalysts. Molecules of the crosslinking agent then attach themselves to one or more of the silicone chains. A crosslinking molecule that attaches itself to only a single chain does little to form extended networks. Even a crosslinking molecule that attaches itself to two chains barely contributes to network forming. But a crosslinking molecule that attaches itself to three or more chains contributes significantly to the vast networks needed to form solids.

The amount of crosslinking agent needed to transform a liquid silicone into a solid gel has been determined theoretically by Flory (Paul J. Flory, J. Phys. Chem. 46, 132 (1942)), Stockmayer (Walter H. Stockmayer, J. Chem. Phys. 11, 45 (1943)), and others. For the case where the crosslinking agent attaches itself only to the ends of the silicone chains, this threshold amount follows a simple formula. The term "coordination number" denotes the number of silicone chain ends to which a single molecule of the crosslinking agent can bind and it is assumed that the crosslinking agent attaches itself to chain ends with perfect efficiency—i.e., that the number of attached chain ends is equal to the number of crosslinker molecules times the crosslinker's coordination number. In that case, the gelation threshold is:

$$\frac{\text{attached chain ends}}{\text{total chain ends}} = \frac{1}{(\text{coordination number} - 1)}$$

For a crosslinking agent that attaches to 3 chains, at least one half of the chain ends must be attached to crosslinking molecules before the material can begin to solidify. For a crosslinking agent that attaches to 4 chains, one third of the chain ends must be attached. And for a crosslinking agent that attaches to 21 chains, only 5% of the chain ends must be attached in order for the material to begin to solidify.

It is clear that a liquid composed of silicone chains can be transformed into a solid by attaching a small fraction of the chains' reactive ends to a crosslinking agent with a large coordination number. If this crosslinking agent forms permanent crosslinks, then it will give the material a permanent equilibrium shape. The remaining reactive chain ends are still available for attachment to something else, such as a temporary crosslinking agent.

Silanol-Terminated Polyorganosiloxanes

Any silanol-terminated polyorganosiloxane may be used to prepare a viscoelastic silicone rubber composition of the invention. As discussed above, silanol-terminated polyorganosiloxanes generally exist as liquids of varying viscosities. Those liquids may be used as the base material for the preparation of a viscoelastic silicone rubber composition of the invention.

The silanol-terminated polyorganosiloxane base which may be used to prepare the viscoelastic silicone rubber compositions are preferably those polyorganosiloxane polymers having primarily methyl groups bound to the silicon atoms making up the siloxane backbone with hydroxyl groups at the terminal ends of the siloxane backbone. The base is typically a liquid polymer composition. The molecular weight of the polymers may range from about 400 to about 50,000 Dalton and preferably from about 400 to about 20,000 Daltons and more preferably from about 2,000 to about 4,500. The viscosity of the polymers may range from about 10 to about 10,000 cSt and preferably from about 15 to 1,000 cSt and more preferably from about 40 to about 150 cSt. Preferred silanol-terminated polyorganosiloxane polymers include: silanol-terminated polydimethylsiloxanes, formula (I); silanol-terminated diphenylsiloxane-dimethylsiloxane copolymers, formula (II); and silanol-terminated poly trifluoropropylmethylsiloxanes, formula (III). These preferred silanol-terminated polyorganosiloxanes are available from Gelest, Inc.

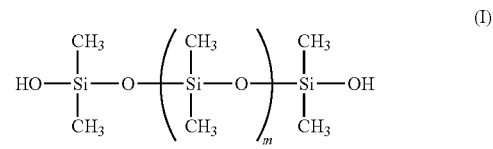

(I)

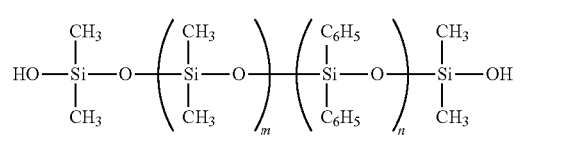

(II)

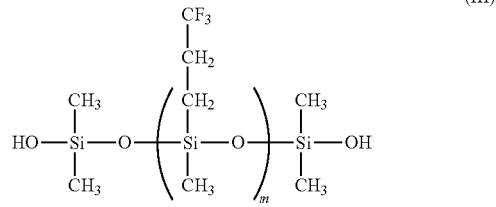

(III)

In formulas (I), (II), and (III), the variables "m" and "n" are both 1 or greater and represent the number of the repeating units in parentheses to give the molecular weight of the particular polymer. Preferred silanol—terminated polyorganosiloxanes are those of formula (I), particularly those available from Gelest Inc. identified in Table 1 below.

TABLE 1

| Gelest Code | Viscosity | Molecular Weight | % (OH) | (OH)-Eq/kg |
|---|---|---|---|---|
| DMS-S12 | 16-32 | 400-700 | 4.5-7.5 | 2.3-3.5 |
| DMS-S14 | 35-45 | 700-1500 | 3.0-4.0 | 1.7-2.3 |
| DMS-S15 | 45-85 | 2000-3500 | 0.9-1.2 | 0.53-0.70 |
| DMS-S21 | 90-120 | 4200 | 0.8-0.9 | 0.47-0.53 |
| DMS-S27 | 700-800 | 18,000 | 0.2 | 0.11-0.13 |
| DMS-S31 | 1000 | 26,000 | 0.1 | 0.055-0.060 |
| DMS-S32 | 2000 | 36,000 | 0.09 | 0.050-0.055 |
| DMS-S33 | 3500 | 43,500 | 0.08 | 0.045-0.050 |
| DMS-S35 | 5000 | 49,000 | 0.07 | 0.039-0.043 |

Crosslinking Agents

One general embodiment of this invention is the combination of a silanol-terminated polyorganosiloxane base with two different crosslinking agents—a siloxane bond forming crosslinking agent and a boron-containing crosslinking agent. As discussed above, a siloxane bond forming crosslinking agent forms permanent siloxane crosslinks with the polymers in the base. The boron-containing crosslinking agent forms temporary crosslinks with that same base. In a viscoelastic silicone rubber composition of the invention, there must be sufficient permanent crosslinking agent present to establish a robust permanent network and give the rubber composition its permanent equilibrium shape. The amount of temporary crosslinking agent may be varied.

Because the permanent and temporary crosslinkers share the same silicone chains, the temporary network does not have to reach the gelation threshold on its own. Instead, the temporary network piggybacks on the permanent network—the permanent linkages act as though they were unusually long-lived linkages within the temporary network. Because the permanent network is above the gelation threshold and the temporary network piggybacks on it, the temporary network is always effectively above the gelation threshold and can always impart time-dependent properties to the material.

The siloxane bond-forming crosslinking agent may be any crosslinking agent known in the art to crosslink silanol-containing siloxane molecules. Suitable siloxane bond-forming crosslinking agents include, for example, polydiethoxysiloxane (PDEOS), tetramethoxysilane (TMOS), tetraethoxysilane (TEOS), methyltriethoxysilane (MTEOS) or tetra-n-propoxysilane. Siloxane bond-forming crosslinking agents are available from Gelest, Inc. The amount of a particular siloxane bond-forming crosslinking agent used depends upon the number of functional groups within the crosslinking agent. The amount of the crosslinking agent must be sufficient to yield a permanent equilibrium shape but generally in less than the amount sufficient to react with all of the silanol groups. The amount of a siloxane bond-forming crosslinking agent needed to react with all the silanol groups, so that there is 1 mole of reactive groups on the crosslinking agent for each 1 mole of silanol groups on the base polymer, is defined to be 100% saturation. As is known in the art, even if a 100% saturation amount of the crosslinking agent is used, some of the silanol groups will remain unreacted.

The boron-containing crosslinking agent may be boric acid (BA) or a boric acid ester such as trimethylborate (TMB), triethylborate (TEB), or tri-isopropyl borate. Due to their chemical structure, boron-containing crosslinking agents have three functional groups by which to react with the silanol groups in the silanol-terminated polyorganosiloxane. The use of a boron compound as the temporary crosslinking agent has an additional consequence: this material embodiment of the invention typically exhibits a remarkably high stiffness and resiliency in response to sudden impacts.

In a viscoelastic silicone rubber composition of the invention, the silanol-terminated polyorganosiloxane is preferably approximately 100% crosslinked by a combination of permanent crosslinks and temporary crosslinks. This degree of crosslinking can be achieved when the sum of the permanent and temporary crosslinking agents equals or exceeds the 100% saturation limit. When excess crosslinking agent is present, some reactive groups on those crosslinking agents will remain unreacted and some of each crosslinking agent may evaporate from the composition. In some embodiments, both the permanent and temporary crosslinking agents may each be used at or above 100% saturation. Competition between those agents for the silanol groups on the base polymer will result in a mixture of permanent and temporary crosslinks. In other embodiments, the siloxane bond-forming crosslinking agent may be used below the 100% saturation limit. For example, the siloxane bond-forming crosslinking agent may be used in an amount ranging from about 20% saturation up to about 100% saturation as long as the amount is sufficient to yield a permanent equilibrium shape. Typically, the siloxane bond-forming crosslinking agent is present in an amount of about 40% saturation to about 80% saturation. The remainder of the crosslinking in the viscoelastic silicone rubber composition is made up of the temporary boron-containing crosslinks. The boron-containing crosslinking agent may be used in an amount ranging from about 20% saturation up to about 100% saturation and in excess amounts, for example, from about 120% to more than 200% saturation, to achieve the desired approximately 100% total crosslinking in the viscoelastic silicone rubber composition. A boron-containing crosslinking agent may then be used in any amount needed to provide the desired degree of temporary crosslinking or in excess amounts to bring the total amount of crosslinking to 100%, or to saturate the crosslinking, of a viscoelastic silicone rubber composition of the invention. The amount of either crosslinking agent to be used may be calculated from the percent saturation desired, the molecular weight and coordination number of the crosslinker, and the effective molecular weight of the particular silanol-terminated polyorganosiloxane used, as is known in the art. For the siloxane bond-forming crosslinking agent, the minimum amount is set by the need to exceed the gelation threshold. For the boron-containing crosslinking agent, the minimum amount is set only by the desired degree of temporary crosslinking. That amount is generally at least 0.005 wt %, or at least 0.1 wt %. Greater amounts of either crosslinking agents may be used and depend upon the composition and properties desired for the particular viscoelastic silicone rubber composition.

One specific embodiment of this invention is the combination of silanol-terminated polydimethylsiloxane (STPDMS) silicone base with tetraethoxysilane (TEOS) as a permanent crosslinker and trimethyl borate (TMB) as a temporary crosslinker. A TEOS molecule has a coordination number of 4, so TEOS can begin to transform the silicone liquid into a permanent solid when it has attached itself to approximately 33.3% of the reactive silanol-terminated ends on the STPDMS molecules. A robust permanent network is obtained when approximately 40% of the reactive ends are permanently bound to TEOS crosslinkers. That leaves 60% of the reactive ends for temporary attachment to TMB.

TMB has a coordination number of 3, so it can begin to transform the silicone liquid into a temporary solid when it has attached itself to approximately 50% of the reactive ends on the STPDMS molecules. Allowing TMB to attach to 60% of those ends results in a fairly robust temporary solid. In this embodiment, both the permanent network and the temporary network are simultaneously and independently above the gelation threshold.

With 40% of its chain ends attached permanently to TEOS molecules and 60% of the chain ends attached temporarily to TMB molecules, the silicone is fully crosslinked with two overlapping and interconnected networks. This material is firmer on short timescales than on long timescales, it relaxes in response to prolonged strain, and it adapts its shape in response to prolonged stress.

Another specific embodiment of this invention is the combination of silanol-terminated polydimethylsiloxane (STPDMS) silicone fluid with methyltriethoxysilane (MTEOS) as a permanent crosslinker and trimethyl borate (TMB) as a temporary crosslinker. An MTEOS molecule has a coordination number of 3, so MTEOS can begin to transform the silicone liquid into a permanent solid when it has attached itself to approximately 50% of the reactive ends on the STPDMS molecules. A robust permanent network is obtained when approximately 60% of the reactive ends are permanently bound to MTEOS crosslinkers. That leaves 40% of the reactive ends for temporary attachment to TMB.

As discussed before, TMB can begin to transform the silicone liquid into a temporary solid when it has attached itself to approximately 50% of the reactive ends on the STPDMS molecules. Allowing TMB to attach to only 40% of those ends means that the temporary network is not independently above the gelation threshold. It piggybacks on the permanent network, however, and so this material exhibits all the features of a robust permanent network coupled with a strong temporary network. It is firmer on short timescales than on long timescales, it relaxes in response to prolonged strain, and it adapts its shape in response to prolonged stress.

Additives and Fillers

The viscoelastic silicone rubber compositions of the invention may also include additives and fillers known for use with silicone rubber compositions such as those discussed above. Fillers may be used in an amount up to about 80 weight percent of rubber composition. As is known in the art the amount of filler used will depend on the particular filler and the desired end use of the viscoelastic silicone rubber composition. For example, a viscoelastic silicone rubber composition of the invention may contain a reinforcing filler such as fumed silica or clay particles. Hexamethylenedisilazane treated fumed silicas from Gelest, Inc., and from Cabot Corp. are preferred reinforcing fillers as are the Garamite clays from Southern Clay products. Reinforcing fillers may be generally used in amounts from about 5 weight percent to about 30 weight percent. Density-reducing fillers such as microballoons or microspheres, e.g., Expancel microspheres from AkzoNobel may be used. The amount of density-reducing fillers depends upon the desired density of the final product. Other traditional fillers such as pigments, insulators, and other inorganic fillers may be used as known in the art.

Adding one or more mixed mineral thixotropes (MMTs) such as Garamite 1958 or Garamite 2578 (Southern Clay Products) as an additive to STPDMS greatly increases the viscosity of the silicone fluid and renders that fluid thixotropic. Dispersing additives such as MMTs in STPDMS can be done effectively using an ordinary blender or immersion blender. The dispersed MMTs (e.g., Garamite 1958 or Garamite 2578) acts as reinforcing filler for the viscoelastic silicone rubber compositions of this invention. For example, adding 5 wt % or more Garamite 1958 to STPDMS substantially increases the elastic modulus, viscous modulus, tensile strength, and tear resistance of viscoelastic silicone rubbers made from that STPDMS. Adding 12.5 wt % or more Garamite 1958 to STPDMS is particularly effective at increasing the elastic modulus, viscous modulus, tensile strength, and tear resistance of a viscoelastic silicone rubbers made from that STPDMS.

When a blend consisting of MMTs dispersed in STPDMS is heated as a thin layer to temperatures ranging from 50° C. to 220° C., moisture is visibly driven out of the blend and the blend's viscosity and thixotropy both increase substantially. This heat treatment is particularly effective when care is taken not to evaporate or sublime a significant fraction of the quaternary ammonium compound(s) contained in the MMTs. Blending from 12.5 wt % to 20 wt % Garamite 1958 in 90-120 cSt STPDMS and then heat-treating that blend at 150° C. to 200° C. produces an exceptionally viscous and thixotropic fluid.

Heat-treated blends of MMTs in STPDMS produce viscoelastic silicone rubbers with excellent characteristics and that heat treatment of a dispersion of MMT in STPDMS can increase the elastic modulus, viscous modulus, tensile strength, and tear resistance of the resulting viscoelastic rubber. Heat-treated blends of 12.5 wt % to 20 wt % Garamite 1958 in 90-120 cSt STPDMS produce viscoelastic silicone rubbers with exceptionally large elastic moduluses, viscous moduluses, tensile strengths, and tear resistances. Even when heat-treated blends of MMTs in STPDMS incorporating other materials, such as plastic microspheres, they can still form viscoelastic silicone rubbers with increased elastic moduluses, viscous moduluses, tensile strengths, and tear resistances.

Methods of Preparation

The viscoelastic silicone rubber compositions may be prepared using the same techniques known to prepare other silicone rubber composition. Preparing the rubber compositions of the invention make use of the known silicone crosslinking and curing chemistries, such as condensation cure. Catalysts known in the art may be used and in similar amounts as with other silicone rubber compositions. Various methods of preparing the viscoelastic silicone rubber compositions are described in the examples below.

In one method to prepare a viscoelastic silicone rubber composition of the invention, the silanol-terminated polyorganosiloxane base may first be reacted with a boron-containing crosslinking agent under conditions to produce a borosilicone compound. This establishes the temporary crosslinking network within the composition. The reaction between the silanol groups and the boron-containing crosslinking compound is rapid, such that when the silanol-terminated polyorganosiloxane base is combined with both crosslinking agents the temporary crosslinking network will form before the permanent crosslinking network. To establish the permanent crosslinking network a siloxane bond-forming crosslinking agent and a catalyst are added to the borosilicone compound to form a mixture. That mixture may optionally include a filler and/or a solvent for one or more components. In some instances the borosilicone compound is itself still a liquid (its gel point is not reached) and the other reactants can be directly added to the liquid borosilicone compound. The mixture is then cured under conditions sufficient to form a viscoelastic silicone rubber composition. The curing step typically takes place in a mold so that the mixture is placed in a mold and then cured to establish its permanent equilibrium state. The viscoelastic silicone rubber compounds of the invention may be molded into any desired shape. Alternatively, and with the various embodiments mentioned, a viscoelastic silicone rubber composition of the invention may also be prepared by: combining a silanol-terminated polyorganosiloxane base with a siloxane bond-forming crosslinking agent, a catalyst, an optional filler, and an optional foaming agent to form a mixture; adding a boron-containing crosslinking agent to the mixture; and curing the mixture under conditions sufficient to form a viscoelastic silicone rubber composition.

Foamed rubber compositions using the viscoelastic silicone rubber compositions of the invention may also be prepared using techniques known in the art. For example a foaming agent may be added to the mixture prior to placing it in a mold or at least prior to curing the mixture. Alternatively, a pressurized gas such as nitrogen may be injected into the mixture during the curing step. Foamed rubber compositions may also be achieved by gas evolution as a by-product of the curing process. Each of these methods, which are known in the art, is described in the examples below.

Uses and Applications of Viscoelastic Siloxane Rubber Compositions

The viscoelastic silicone rubber compositions of the invention may be used in the same way and applications as other viscoelastic rubber compositions such as bouncing putty, viscoelastic urethane foams, and other known viscoelastic compositions and high-resilience compositions. Common among the applications and uses of bouncing putty and other such compositions are time delays, motion rate governors, shock absorbing devices, motion coupling devices, furniture leveling devices, adaptive padding, and therapy putties. For a number of these uses, however, the bouncing putty requires containment to keep the putty from flowing beyond its intended region—something that the viscoelastic silicone rubber compositions of the invention do not require. More specific uses and applications include, but are not limited to, acoustic coupling devices; arch supports for shoes; body armor; cargo restraints; cleaning rollers and pads; doorstops; earplugs; exercise devices; furniture leveling devices; grips for tree shakers; grips for writing implements; heel stabilizers for shoes; impact force dispersion devices and equipment; insoles for shoe; mattresses; momentum dispersion devices and equipment; motion and intrusion sensors; motion rate governors; padding and support for flooring materials; padding for bicycle seats; padding for boots; padding for cameras; padding for crutches; padding for earpieces; padding for firearms; padding for hearing aids; padding for shoulder straps; padding for sports equipment; prostheses; physical therapy materials; safety cushions and pads; seals for sound, heat, and chemicals; shock dispersion devices and equipment; straps and cords; time delay devices; toys; vibration, rattling, chattering, buzzing, and motion snubbers; vibration transducers; and wedges and other retaining devices.

The viscoelastic silicone rubber compounds of the invention have a tacky surface. This allows the rubber composition to adhere to another material such as cloth. The tacky surface of the compounds may also be passivated by coating the surface with a solution containing a further amount of a siloxane bond-forming crosslinking agent, such as TEOS, and a catalyst. The solution may also contain additional silanol-terminated polyorganosiloxanes. Passivating the surface layer removes its tackiness.

EXAMPLES

The materials used in the examples below are listed in Table 2. In the examples below an expression such as "BA or TMB at nn % saturation (in STPDMS)" refers to the amount of BA or TMB added to a particular STPDMS is sufficient to bind with nn % of the silanol groups on that STPDMS. Similarly, the expression "PDEOS, TEOS, or MTEOS at nn % saturation (in STPDMS)" refers to the amount of PDEOS, TEOS, or MTEOS added to a particular STPDMS is sufficient to bind with nn % of the silanol groups on that STPDMS. And, the expression "nn wt % (in STPDMS)" refers to the amount of a particular compound added is nn % of the weight of the STPDMS contained in that blend. Shore Hardness was measured according to ASTM 2240.

TABLE 2

| | |
|---|---|
| PDMS | trimethyl-terminated polydimethylsiloxane fluid |
| STPDMS | silanol-terminated polydimethylsiloxane fluid |
| 16-32 cSt STPDMS | STPDMS having a viscosity of 16-32 cSt (Gelest DMS-S12) |
| 45-85 cSt STPDMS | STPDMS having a viscosity of 45-85 cSt (Gelest DMS-S15) |
| 90-120 cSt STPDMS | STPDMS having a viscosity of 90-120 cSt (Gelest DMS-S21) |
| 700-800 cSt STPDMS | STPDMS having a viscosity of 700-800 cSt (Gelest DMS-S27) |
| 3500 cSt STPDMS | STPDMS having a viscosity of 3500 cSt (Gelest DMS-S33) |
| BA | boric acid, $B(OH)_3$ |
| TMB | trimethyl borate, $B(OCH_3)_3$ |
| PDEOS | polydiethoxysiloxane (Gelest PSI-021) |
| TEOS | tetraethoxysilane (Gelest SIT7110.0) |
| MTEOS | methyltriethoxysilane (Alfa/Aesar) |
| IP | Isopropanol |
| TFS | hexamethyldisilazane treated fume silica (Gelest SIS6962.0) |
| TO | tin II octoate (Gelest SNB1100) |
| AMA | AeroMarine Rapid Set Silicone Cure Accelerator (AeroMarine Products, San Diego, CA). |
| PMHS | polymethylhydrosiloxane (Gelest HMS-991) |
| PMHS-PDMS copolymer | Polymethylhydrosiloxane-PDMS copolymer (Gelest HMS-301) |
| G1958 | Garamite 1958 (Southern Clay Products) |

Example 1

100% BA and 100% PDEOS in 90-120 cSt STPDMS, with TFS reinforcement In this Example, 90-120 cSt STPDMS was combined with BA at 100% saturation to form a borosilicone. PDEOS was then added to the resulting borosilicone at 100% saturation to obtain a viscoelastic silicone rubber. Specifically, 12.47 g BA was dissolved in 160.0 g of IP and then 1267.3 g of 90-120 cSt STPDMS was added to the IP solution. The mixture was then heated at 90° C. for 3 days to evaporate the solvent and volatile reaction products and form a borosilicone putty. That putty was further dried by heating at 180° C. in a convection oven for 4 hours.

50.28 g of the dried borosilicone putty was again dissolved in 2.51 g of IP, and 10.06 g of TFS (treated fumed silica) reinforcing filler was carefully dispersed in it by stirring with a glass rod. To this reinforced borosilicone solution, 1.607 g of PDEOS crosslinker and 0.668 g of TO catalyst were added. The resulting mixture was degassed in vacuum and poured into 5 molds. After allowing them to cure for 3 days, the 5 samples were removed from their molds. After approximately 1 month of additional curing at room temperature, their characteristics appeared stable.

These samples were stiff to the touch and exhibited viscoelastic behavior. Their Shore Hardness was determined to be 57A, 66O at t=0 and 23A, 32O at t=60 sec. They also exhibited remarkable resiliency when subject to sudden impact.

Example 2

100% BA and 100% PDEOS in 700-800 cSt STPDMS, with TFS reinforcement In this Example, 700-800 cSt STPDMS was combined with BA at 100% saturation. PDEOS was then added to the borosilicone at 100% saturation, and a viscoelastic silicone rubber was obtained. Specifically, 3.506 g BA was dissolved in 60 g of IP followed by addition of 1526.7 g of 700-800 cSt STPDMS. The mixture was heated at 90° C. for 3 days to evaporate the solvent and volatile reaction products and form a borosilicone putty. That putty was further dried by heating in batches at 180° C. in a convection oven for 4 hours.

100.5 g of the dried borosilicone putty was again dissolved in 5.0 g of IP and then 20.0 g of TFS reinforcing filler was carefully dispersed in it by stirring with a glass rod. To this reinforced borosilicone solution, 0.749 g of PDEOS crosslinker and 0.500 g of TO catalyst were added. The mixture was degassed in vacuum and poured into 8 molds. After allowing them to cure for 23 days, the 8 samples were removed from their molds. After approximately 2 months of additional curing at room temperature, their characteristics appeared stable.

These samples were soft to the touch and exhibited viscoelastic behavior. Their Shore Hardness was determined to be 47O at t=0 and 6O at t=60 sec. They also exhibited remarkable resiliency when subject to sudden impact.

Example 3

100% BA and 80% PDEOS in 90-120 cSt STPDMS, with TFS reinforcement In this Example, 90-120 cSt STPDMS was combined with BA at 100% saturation to form a borosilicone. PDEOS was then added to the resulting borosilicone at 80% saturation to obtain a viscoelastic silicone rubber. Specifically, 500 g of the dried borosilicone putty from Example 1 above was dissolved in approximately 25 g of IP and then 100 g of TFS reinforcing filler was carefully dispersed in it by stirring with a glass rod. To 91.121 g of this reinforced borosilicone solution, 1.863 g of PDEOS crosslinker and 0.911 g of TO catalyst were added. The mixture was degassed in vacuum and poured it into 8 molds. After allowing them to cure for 16 days, the 8 samples were removed from their molds. After approximately 2 month of additional curing at room temperature, their characteristics appeared stable.

These samples were medium-stiff to the touch and exhibited viscoelastic behavior. Their Shore Hardness was determined to be 53A, 64O at t=0 and 11A, 22O at t=60 sec. They also exhibited remarkable resiliency when subject to sudden impact.

Example 4

100% BA and 100% PDEOS in 90-120 cSt STPDMS, with Microballoons and TFS-Reinforcement In this embodiment and example, the procedure of Example 1 was repeated, except that gas-filled plastic microballoons were added in sufficient quantity so as to approximately double the volume of the fluid before pouring it into a mold. A viscoelastic silicone foam rubber was obtained by this process.

Specifically, a TFS-reinforced borosilicone solution identical to the solution of Example 1 was prepared. To that solution, a 100% saturation of PDEOS and 1 wt % of TO catalyst were added. The plastic microballoons (Expancel 920 DE 40 d30) were then blended in sufficient quantity so as to approximately double the volume of the fluid. The mixture was degassed in vacuum and transferred to a mold. After allowing it to cure for 3 days, the sample was removed from its mold. After approximately 5 days of additional curing at room temperature, its characteristics appeared stable.

This sample had a relatively low density (~0.5 g/cc). It was stiff to the touch and exhibited viscoelastic behavior. Its Shore Hardness was determined to be 60A, 65O at t=0 and 35A, 48O at t=60 sec. It also exhibited remarkable resiliency when subject to sudden impact.

Comparative Example A

100% BA in 90-120 cSt STPDMS at Room Temperature

In this comparative example a borosilicone solid was prepared entirely at room temperature and without a catalyst by combining 90-120 cSt STPDMS with BA at 100% saturation. The transformation of that borosilicone solid into a borosilicone fluid was observed upon exposure to ambient air. Specifically 0.196 g of BA was dissolved in 2.0 g of IP and 20.0 g of 90-120 cSt STPDMS was combined with that solution. The resulting liquid was poured onto a glass surface as a thin layer. The solvent and volatile reaction products were allowed to evaporate at room temperature.

The result was a stiff, transparent silicone rubber—it responded elastically to stress or strain and showed no evidence of flow or relaxation on timescales up to 1 hour.

After exposure to the ambient air for a day, however, this solid borosilicone elastomer transformed into a fluid borosilicone elastomer—a bouncing putty. It began to flow in response to stress and would no longer return to its original shape when the stress was removed.

One possible theoretical explanation for this transformation is as follows. The as-prepared silicone rubber was essentially free of water and alcohol molecules, so the oxygen-boron-oxygen crosslinks that bound the individual silicone chains into a vast network were effectively permanent. When humidity from the air had diffused into the silicone rubber, however, those water molecules could hydrolyze the oxygen-boron-oxygen crosslinks. The crosslinks could then open and close to allow the silicone elastomer's network to relax when the elastomer was subject to strain. Since the network no longer had a fixed topology, the overall material was a fluid rather than a solid.

Comparative Example B

100% TMB in 90-120 cSt STPDMS at Room Temperature

In this comparative example, a borosilicone solid was prepared entirely at room temperature and without a catalyst by combining 90-120 cSt STPDMS with TMB at 100% saturation. The transformation of that borosilicone solid into a borosilicone fluid was observed upon exposure to ambient air. Specifically, 0.165 g TMB was combined with 10.0 g of 90-120 cSt STPDMS. The resulting liquid formed a shallow layer in a glass beaker. The volatile reaction products were allowed to evaporate at room temperature.

The result was a stiff, transparent silicone rubber—it responded elastically to stress or strain and showed no evidence of flow or relaxation on timescales up to 1 hour. This borosilicone rubber was essentially indistinguishable from a conventional silicone rubber.

After exposure to the ambient air for a day, however, this solid borosilicone elastomer transformed into a fluid borosilicone elastomer—a bouncing putty. It began to flow in response to stress and would no longer return to its original shape when the stress was removed. The possible theoretical explanation for the transformation given in Comparative Example A applies to this example as well.

Example 5

50% TMB and 50% PDEOS in 90-120 cSt STPDMS, without Reinforcement

In this example, 90-120 cSt STPDMS was combined with PDEOS at 50% saturation and TMB at 50% saturation. A viscoelastic silicone rubber was obtained. Specifically, 10.0 g of 90-120 cSt STPDMS was combined with 0.160 g PDEOS, 0.050 g TO catalyst, and 0.050 g AMA catalyst. 0.082 g TMB was then added to the liquid and the blend was poured into a mold.

After allowing the sample to cure for about 3 days, the sample was removed from its mold. Because it contained no reinforcing filler, it was fragile and sustained some damage during attempts to remove it from its mold. Nonetheless, it was extracted intact. After approximately 10 days of additional curing at room temperature, its characteristics appeared stable.

This sample was soft to the touch and exhibited viscoelastic behavior. Although its Shore Hardnesses could not be measured, it was clearly much firmer on short timescales (<1 second) than it was on long timescales (>20 seconds). It also exhibited remarkable resiliency when subject to sudden impact.

Example 6

50% TMB and 50% PDEOS in TFS-Reinforced 90-120 cSt STPDMS with >3 wt % AMA

In this example, TFS-reinforced 90-120 cSt STPDMS was combined with PDEOS at 50% saturation and TMB at 50% saturation. A viscoelastic silicone rubber was obtained. More than 3 wt % of AMA was used as a catalyst, which contributed additional crosslinking. Specifically a reinforced 90-120 cSt STPDMS was prepared by adding 20 wt % TFS reinforcing filler to 90-120 cSt STPDMS and blending the fluid with a three-roll mill. The resulting liquid was homogeneous and translucent.

48.0 g of TFS-reinforced 90-120 cSt STPDMS, 0.639 g PDEOS, and 1.280 g AMA catalyst were combined. 0.330 g TMB was then added to the liquid and the blend was poured into 5 molds. After allowing the samples to cure overnight, the samples were removed from their molds. After approximately 10 days of additional curing at room temperature, their characteristics appeared stable.

These samples were medium-stiff to the touch and exhibited viscoelastic behavior. Their Shore Hardness was 46A, 55O at t=0 and 31A, 44O at t=60 sec. They also exhibited remarkable resiliency when subject to sudden impact.

Example 7

50% TMB and 50% PDEOS in TFS-reinforced 700-800 cSt STPDMS with >3 wt % AMA

In this example, TFS-reinforced 700-800 cSt STPDMS was combined with PDEOS at 50% saturation and TMB at 50% saturation. A viscoelastic silicone rubber was obtained. More than 3 wt % of AMA was used as a catalyst, which contributed additional crosslinking. Specifically, a reinforced 700-800 cSt STPDMS was prepared by adding 20 wt % TFS reinforcing filler to 700-800 cSt STPDMS and blending the fluid with a three-roll mill. The resulting liquid was homogeneous and translucent.

36.0 g of TFS-reinforced 700-800 cSt STPDMS, 0.112 g PDEOS, and 0.960 g AMA catalyst were combined. 0.058 g TMB was then added to the liquid and the blend was poured into 3 molds. After allowing the samples to cure for 4 days, the 3 samples were removed from their molds. After approximately 20 days of additional curing at room temperature, their characteristics appeared stable.

These samples were soft to the touch and exhibited viscoelastic behavior. Their Shore Hardness was 20A, 35O at t=0 and 11A, 25O at t=60 sec. They also exhibited remarkable resiliency when subject to sudden impact.

Example 8

50% TMB and 50% PDEOS in TFS-Reinforced 90-120 cSt STPDMS with 0.5 wt % AMA

In this example TFS-reinforced 90-120 cSt STPDMS was combined with PDEOS at 50% saturation and TMB at 50% saturation. With 100% saturation of the silanol-groups, a viscoelastic silicone rubber was obtained. Only 0.5 wt % of AMA was used as catalyst to limit the amount of additional crosslinking. Specifically, a TFS-reinforced 90-120 cSt STPDMS was prepared as in Example 6. 48.0 g of reinforced 90-120 cSt STPDMS, 0.639 g PDEOS, 0.200 g TO catalyst, and 0.200 g AMA catalyst were combined. 0.330 g TMB was then added to the liquid, and the blend was poured into 5 molds. One of the samples was immediately put in a dehydrator to cure at 63° C. The other samples cured at room temperature.

After allowing the samples to cure for 4 days, the 5 samples were removed from their molds. The hot-cured sample reached stable characteristics after about 5 days, while the room temperature cured samples took about 20 days to reach similar characteristics. Measurements of the time-dependent Young's moduluses and relaxation time constants of the hot-cured and cold-cured samples showed that the hot-cured samples reach full cure faster than the cold-cured samples. When fully cured hot-cured and cold-cured samples were allowed to equilibrate with ambient air for several days, their characteristics were indistinguishable.

These samples were medium-stiff to the touch and exhibited viscoelastic behavior. Their Shore Hardness was 53A, 62O at t=0 and 22A, 32O at t=60 sec. They also exhibited remarkable resiliency when subject to sudden impact.

Example 9

60% TMB and 40+% PDEOS in TFS-reinforced 90-120 cSt STPDMS with 0.2 wt % AMA

In this example, TFS-reinforced 90-120 cSt STPDMS was combined with PDEOS at slightly more than 40% saturation and with TMB at 60% saturation. A viscoelastic silicone rubber was obtained. Only 0.2 wt % of AMA was used as catalyst in order to limit the amount of additional crosslinking. Specifically, a TFS-reinforced 90-120 cSt STPDMS was prepared as in Example 6. 24.0 g of reinforced 90-120 cSt STPDMS, 0.263 g PDEOS, 0.160 g TO catalyst, and 0.040 g AMA catalyst were combined. 0.198 TMB was then added to the liquid, and the blend was poured into 2 molds. Both samples were immediately put in a dehydrator to cure at 63° C.

After allowing the samples to cure for 2 days, the 2 samples were removed from their molds. After approximately 14 days of curing at 63° C., their characteristics were stable.

These samples were medium-stiff to the touch and exhibited viscoelastic behavior. Their Shore Hardness was 49A, 62O at t=0 and 11A, 25O at t=60 sec. They also exhibited remarkable resiliency when subject to sudden impact.

Example 10

Silicone Foam Rubber Prepared with High-Pressure Nitrogen Gas

In this example, a viscoelastic silicone foam rubber was produced by dissolving nitrogen gas at high pressure in the rubber as it was curing, and then releasing the pressure suddenly. Specifically, a TFS-reinforced 90-120 cSt STPDMS was prepared as in Example 6 and was combined with PDEOS at 50% saturation and TMB at 50% saturation, along with 1 wt % AMA as catalyst. It was formed into a sheet approximately 4 mm thick. After allowing the material to partially cure at 63° C. in a dehydrator, portions of that sheet were exposed to 1500 psi nitrogen gas in a high-pressure cell for between 5 and 30 minutes at room temperature. When the pressure was suddenly released, the nitrogen came out of solution in the silicone so abruptly that it nucleated countless tiny bubbles. Those bubbles subsequently expanded as the remaining nitrogen left the silicone. After a few seconds, the material had transformed into a low-density viscoelastic silicone foam rubber. It was returned to the dehydrator to finish curing at 63° C. Several samples were prepared this way, all with similar characteristics.

These samples were medium-stiff to the touch and exhibited viscoelastic behavior. Although their Shore Hardnesses could not be measured, they were much firmer on short timescales (<1 second) than they were on long timescales (>20 seconds). They also exhibited remarkable resiliency when subject to sudden impact.

Example 11

Silicone Foam Rubber Prepared Via Gas Generated During the Curing Reaction

In this example, a TFS-reinforced 90-120 cSt STPDMS was combined with TMB at 65% saturation and PMHS at 50% saturation. The curing reaction between PMHS and STPDMS generated hydrogen gas, which transformed the mixture into a foamed solid. Specifically, a TFS-reinforced 90-120 cSt STPDMS was prepared as in Example 6. A TFS-reinforced borosilicone was then prepared by adding TMB at 65% saturation to the reinforced 90-120 cSt STPDMS. This borosilicone was dried at 63° C. in the dehydrator.

6.313 g of the reinforced borosilicone, 0.084 g PMHS, and 0.103 g AMA catalyst were then combined. They were stirred together rapidly, and they began to foam. The foaming liquid was poured into a mold, and the mold was capped so that the foam could not expand beyond about twice its un-foamed volume. After about 5 hours, the cap on the mold was removed. The cured material initially bulged out of the mold but returned to its in-mold shape over the next several hours as hydrogen gas diffused out of the material. The sample was then put in the dehydrator to cure at 63° C.

This sample was medium-stiff to the touch and exhibited viscoelastic behavior. Its Shore Hardness was 36O at t=0 and 20O at t=60 sec. It also exhibited remarkable resiliency when subject to sudden impact.

Example 12

50% PDEOS and 50% TMB in 20 wt % TFS-Reinforced 90-120 cSt STPDMS

In this example, 20 wt % TFS was added to 90-120 cSt STPDMS. A 3-roll mill was used to disperse the TFS in the STPDMS. To 140.0 g of this blend, 0.583 g of AMA (0.5 wt %), 0.583 g of TO (0.5 wt %), 1.864 g of PDEOS (50% saturation) and 0.963 g TMB (50% saturation) were added. The mixture was blended carefully with a glass rod, degassed it in vacuum, and poured into molds. The samples were then put in the dehydrator to cure and dry at 63° C.

These samples were medium-stiff to the touch and exhibited strong viscoelastic behavior. Their Shore Hardness was 49A, 59O at t=0 and 16A, 27O at t=60 sec.

Figure 2:
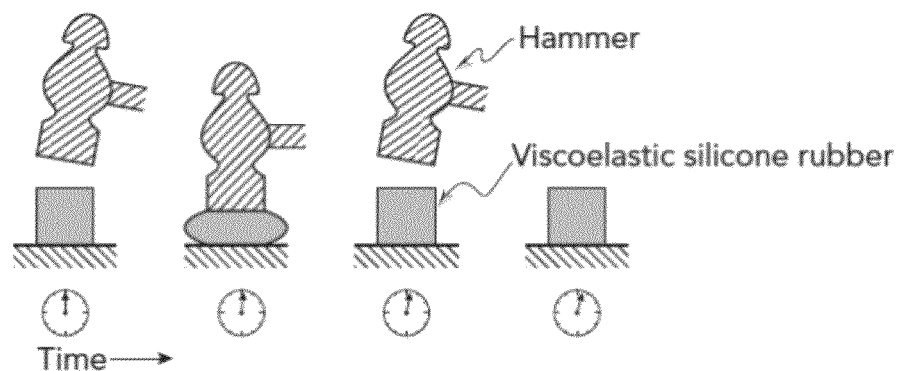
FIG. 2 depicts the resiliency of a cylinder of a viscoelastic silicone rubber composition of the invention when struck sharply by a steel hammer, showing no residual deformation after impact.
Figure 3:
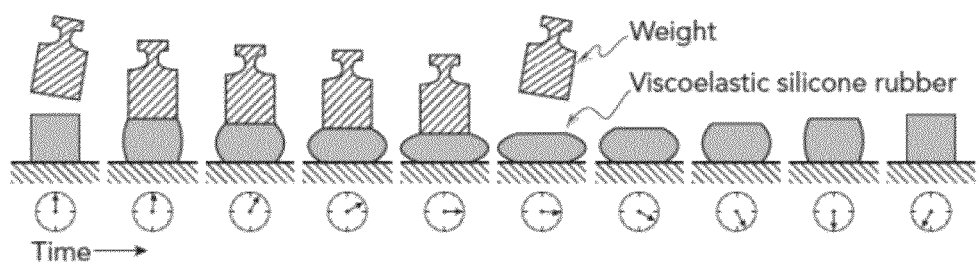
FIG. 3 depicts the effect of a sustained compressive force on a cylinder of a viscoelastic silicone rubber composition of the invention, reducing the thickness of a cylinder substantially until, when the compressive force is removed, the cylinder gradually returns to its original height and shape.

Most of the samples were cylinders 2 cm in diameter and 1.5 cm high. These cylinders were resilient when struck by a steel hammer, showing no residual deformation after impact. See FIG. 2. However, a sustained compressive force reduced the thickness of a cylinder substantially. When exposed to about 200 newtons (50 pounds) of compressive force, the cylinder height was reduced to about 0.5 cm. When that compressive force was removed, the cylinder gradually returned to its original height and shape. See FIG. 3.

This viscoelastic silicone rubber exhibited stretched exponential stress relaxation following sudden compressive or tensile strain. Its elastic modulus (time-independent Young's modulus) was measured to be 240 kPa and its viscous modulus (time-dependent Young's modulus, relaxing to zero at infinite time) to be 2.0 MPa.

Example 13

50% PDEOS and 50% TMB in 20 wt % TFS-Reinforced 45-85 cSt STPDMS

In this example, 20 wt % TFS was added to 45-85 cSt STPDMS, using a 3-roll mill to disperse the TFS in the STPDMS. To 140.0 g of this blend 0.583 g of AMA (0.5 wt %), 0.583 g of TO (0.5 wt %), 2.847 g of PDEOS (50% saturation) and 1.471 g TMB (50% saturation) were then added. The mixture was carefully blended by stirring with a glass rod, degassed in vacuum, and poured into molds. The samples were then put in the dehydrator to cure and dry at 63° C.

These samples were medium-stiff to the touch and exhibited strong viscoelastic behavior. Their Shore Hardness was 54A, 64O at t=0 and 23A, 32O at t=60 sec.

Most of the samples were cylinders 2 cm in diameter and 1.5 cm high. These cylinders were resilient when struck by a steel hammer, showing no residual deformation after impact. See FIG. 2. However, a sustained compressive force reduced the thickness of a cylinder substantially. When exposed to about 200 newtons (50 pounds) of compressive force, the cylinder height was reduced to about 0.5 cm. When that compressive force was removed, the cylinder gradually returned to its original height and shape. See FIG. 3.

These samples were somewhat firmer on impact than those of Example 12, although the two examples were otherwise very similar in character. One possible explanation for the enhanced firmness of Example 13 during impact is that the shorter silicone chains in Example 13 pull taut during impact deformation and strongly oppose further deformation. Example 12, with its longer silicone chains, would require more severe deformation before its chains pull taut.

This viscoelastic silicone rubber of this example exhibited stretched exponential stress relaxation following sudden compressive or tensile strain. Its elastic modulus was measured to be 280 kPa and its viscous modulus to be 1.9 MPa.

Example 14

40% PDEOS and 60% TMB in 20 wt % TFS-Reinforced 90-120 cSt STPDMS

In this example, 20 wt % TFS was added to 90-120 cSt STPDMS. A 3-roll mill was used to disperse the TFS in the STPDMS. To 140.0 g of this blend 0.583 g of AMA (0.5 wt %), 0.583 g of TO (0.5 wt %), 1.491 g of PDEOS (40% saturation) and 1.156 g TMB (60% saturation) were added. The mixture was carefully blended by stirring with a glass rod, degassed in vacuum, and poured into molds. The samples were then put in the dehydrator to cure and dry at 63° C.

These samples were medium-soft to the touch and exhibited strong viscoelastic behavior. Their Shore Hardness was 45A, 58O at t=0 and 7A, 19O at t=60 sec.

Most of the samples were cylinders 2 cm in diameter and 1.5 cm high. These cylinders were resilient when struck by a steel hammer, showing no residual deformation after impact. See FIG. 2. However, a sustained compressive force reduced the thickness of a cylinder substantially. When exposed to about 200 newtons (50 pounds) of compressive force, the cylinder height was reduced to about 0.5 cm. When that compressive force was removed, the cylinder gradually returned to its original height and shape. See FIG. 3.

These samples were softer in response to sustained compressive stress than those of Examples 12 or 13. They deformed more easily and more extensively. During impact, however, they were still very firm.

This viscoelastic silicone rubber of this example exhibited stretched exponential stress relaxation following sudden compressive or tensile strain. Its elastic modulus was measured to be 90 kPa and its viscous modulus to be 1.8 MPa.

Example 15

50% PDEOS and 50% TMB in 20 wt % TFS-Reinforced 90-120 cSt STPDMS, Added to Fabric In this example, 20 wt % TFS was added to 90-120 cSt STPDMS. A 3-roll mill was used to disperse the TFS in the STPDMS. To 40.0 g of this blend, 0.400 g of AMA (1.0 wt %), 0.640 g of PDEOS (50% saturation) and 0.330 g TMB (50% saturation) were added. The mixture was carefully blended by stirring with a glass rod, degassed in vacuum, and then used to fully wet a 15 cm×15 cm portion of fleece fabric. The fabric was hung up as though on a clothes line for several hours and then put in a dehydrator to cure and dry at 63° C.

Although its Shore Hardness could not be measured, the resulting treated fabric was clearly much stiffer on short timescales (<1 second) than it was on long timescales (>10 seconds). It was resilient when struck by a steel hammer, but was flexible and medium-soft when manipulated slowly. In short, the treated fabric showed all of the viscoelastic properties of the viscoelastic silicone rubber with which it was impregnated.

Example 16

50% PDEOS and 50% TMB in 10 wt % G1958-Reinforced 90-120 cSt STPDMS

In this example, 10 wt % G1958 (Garamite 1958, Southern Clay Products) was added to 90-120 cSt STPDMS. A 3-roll mill was used to disperse the G1958 in the STPDMS. 11.0 g of this G1958-based blend was then combined with 0.200 g AMA (2 wt %), 0.160 g PDEOS (50% Saturation), and 0.082 g TMB (50% Saturation). The mixture was degassed and poured into a mold. The material was allowed to cure and dry in the dehydrator at 63° C. It became a firm viscoelastic material.

This viscoelastic silicone rubber exhibited stretched exponential stress relaxation following sudden compressive or tensile strain. Its elastic modulus was measured to be 96 kPa and its viscous modulus to be 2.6 MPa. Its Shore Hardness was 53A, 63O at t=0 and 14A, 30O at t=60 sec.

Example 17

65% MTEOS and 37% TMB in 30 wt % TFS Reinforced 90-120 cSt STPDMS

In this example, 30 wt % TFS was dispersed in 90-120 cSt STPDMS using a 3-roll mill. To 15.0 g of this blend, 0.231 g AMA (2 wt %), 0.212 g MTEOS (65% Saturation), and 0.070 g TMB (37% Saturation) were added. The mixture was degassed in vacuum, placed in a mold, and allowed to cure and dry at 63° C. in a dehydrator. The resulting material was highly viscoelastic.

This viscoelastic silicone rubber exhibited stretched exponential stress relaxation following sudden compressive or tensile strain. Its elastic modulus was measured to be 140 kPa and its viscous modulus to be 1.2 MPa. Its Shore Hardness was determined to be 46A, 60O at t=0 and 31A, 42O at t=60 sec.

Example 18

3 wt % Expancels in 100% TEOS and 120% TMB in 10 wt % G1958-Reinforced 90-120 cSt STPDMS In this example 10 wt % G1958 was dispersed in 90-120 cSt STPDMS using a three-roll mill. To 22 g of this blend, 0.300 g 930 DU 120 Expancels was added, and the mixture was then heated for 15 minutes at 165° C. to expand the Expancels. To 10.02 g of the resulting foamed G1958 blend, 0.195 g AMA (2 wt %), 0.192 g TMB (120% Saturation), and 0.241 g TEOS (100% Saturation) were added. The mixture was kneaded into a putty and squeezed into a mold. The material was allowed to cure and dry at 63° C. in the dehydrator. It became a viscoelastic foam rubber.

This viscoelastic silicone rubber exhibited stretched exponential stress relaxation following sudden compressive or tensile strain. Its elastic modulus was measured to be 300 kPa and its viscous modulus to be 4.1 MPa. Its Shore Hardness was 44A, 55O at t=0 and 20A, 34O at t=60 sec.

Example 19

100% TEOS and 50% TMB in heat-treated 20 wt % G1958-Reinforced 90-120 cSt STPDMS In this example, 20 wt % G1958 was dispersed in 90-120 cSt STPDMS using an immersion blender. This blend was then heat-treated in a sealed aluminum foil packet for 1 hour in a 180° C. convection oven. The resulting blend was extremely viscous and thixotropic.

To 14.142 g of this blend, 0.098 g TMB (50% Saturation), 0.236 g AMA (2 wt %), and 0.293 g TEOS (100% Saturation) were added. The mixture was scooped into a mold and allowed to cure, first for 1 hour at room temperature, then overnight in the dehydrator at 63° C. The material became highly viscoelastic and firm.

This viscoelastic silicone rubber exhibited stretched exponential stress relaxation following sudden compressive or tensile strain. Its elastic modulus was measured to be 2.0 MPa and its viscous modulus to be 7.6 MPa. Its Shore Hardness was 77A, 78O at t=0 and 53A, 64O at t=60 sec.

Example 20

100% TEOS and 60% TMB in heat-treated 10 wt % G1958-Reinforced 90-120 cSt STPDMS In this example, 10 wt % G1958 was dispersed in 90-120 cSt STPDMS using an immersion blender. This blend was then heat-treated in a sealed aluminum foil packet for 1 hour in a 180° C. convection oven. The resulting blend was extremely viscous and thixotropic.

To 13.0 g of this blend, 0.117 g TMB (60% Saturation), 0.236 g AMA (2 wt %), and 0.293 g TEOS (100% Saturation) were added. The mixture was degassed in vacuum, scooped into a mold, and allowed to cure in the dehydrator at 63° C. The material became highly viscoelastic and firm.

This viscoelastic silicone rubber exhibited stretched exponential stress relaxation following sudden compressive or tensile strain. Its elastic modulus was measured to be 1.2 MPa and its viscous modulus to be 3.2 MPa. Its Shore Hardness was 65A, 74O at t=0 and 46A, 59O at t=60 sec.

Example 21

80% TEOS and 60% TMB in heat-treated 12.5 wt % G1958-Reinforced 90-120 cSt STPDMS In this example, 12.5 wt % G1958 was dispersed in 90-120 cSt STPDMS using an immersion blender. This blend was then heat-treated in a sealed aluminum foil packet for 40 minutes in a 180° C. convection oven. The resulting blend was extremely viscous and thixotropic.

To 16.233 of this blend, 0.119 g TMB (60% Saturation), 0.289 g AMA (2 wt %), and 0.287 g TEOS (80% Saturation) were added. The mixture was placed in a polyethylene bag and degassed in vacuum. The bag was zipped closed without any air in it. The end of the bag was cut off, and the pasty mixture was squeezed into a mold. The mixture in the mold was allowed to cure in the dehydrator at 63° C., and the material became highly viscoelastic and firm.

This viscoelastic silicone rubber exhibited stretched exponential stress relaxation following sudden compressive or tensile strain. Its elastic modulus was measured to be 670 MPa and its viscous modulus to be 4.9 MPa. Its Shore Hardness was 65A, 72O at t=0 and 38A, 54O at t=60 sec.

Example 22

100% TEOS and 60% TMB in 3 wt % Expancels in heat-treated 10 wt % G1958-Reinforced 90-120 cSt STPDMS In this example, 10 wt % G1958 was dispersed in 90-120 cSt STPDMS using an immersion blender. 3 wt % Expancels 930 DU 120 was stirred in. The blend was heat-treated and the Expancels were expanded by wrapping the mixture in aluminum foil and placing it in a 180° C. convection oven for 30 minutes.

To 100 g of this foamed G1958-reinforced blend 0.900 g TMB (60% Saturation), 1.818 g AMA (2 wt %), 2.255 g TEOS (100% Saturation) were added. The mixture was stirred until it began to clump into a putty. The putty was rolled into a ball and allowed to cure at room temperature. It became a firm, low-density viscoelastic silicone rubber ball.

Examples 23-27

Range of Firmness in 30 wt % TFS-Reinforced 90-120 cSt STPDMS

In these examples, 30 wt % TFS was dispersed in 90-120 cSt STPDMS using a 3-roll mill. The following 5 blends were then prepared by adding TMB, then 2 wt % AMA, and then either MTEOS or TEOS to portions of the TFS-STPDMS blend in accordance with Table 3 below:

TABLE 3

| Example | Temporary Crosslinker | Permanent Crosslinker | Hardness at t = 0 | Hardness at t = 60 sec | Hardness at t = 120 sec |
|---|---|---|---|---|---|
| 23 | 60% TMB | 60% MTEOS | 50A, 62O | 34A, 48O | 29A, 41O |
| 24 | 60% TMB | 40% TEOS | 51A, 63O | 33A, 48O | 27A, 41O |
| 25 | 60% TMB | 50% TEOS | 56A, 66O | 43A, 54O | 36A, 48O |
| 26 | 60% TMB | 60% TEOS | 68A, 77O | 39A, 52O | 35A, 46O |
| 27 | 60% TMB | 70% TEOS | 60A, 68O | 43A, 53O | 37A, 49O |

After curing at 63° C. in the dehydrator for several days and drying for two months, these samples were highly viscoelastic and had the Shore Hardness listed in Table 3. These data show that the Shore Hardnesses of these viscoelastic siloxane rubber compositions, according to the invention, decrease with increasing time.

Examples 28-32

Range of Firmness in 12.5 wt % G1958-Reinforced 90-120 cSt STPDMS

In these examples, 12.5 wt % G1958 was dispersed in 90-120 cSt STPDMS using an immersion blender. This blend was then heat-treated as a thin layer on an aluminum surface for 5 minutes at 180° C. The resulting blend was extremely viscous and thixotropic.

The following 5 blends were then prepared by adding TMB, then 2 wt % AMA, and then either MTEOS or TEOS to portions of the G1958-STPDMS blend in accordance with Table 4 below:

TABLE 4

| Example | Temporary Crosslinker | Permanent Crosslinker | Hardness at t = 0 | Hardness at t = 60 sec | Hardness at t = 120 sec |
|---|---|---|---|---|---|
| 28 | 60% TMB | 50% TEOS | 64A, 71O | 42A, 54O | 31A, 47O |
| 29 | 50% TMB | 60% MTEOS | 62A, 71O | 44A, 55O | 36A, 48O |
| 30 | 60% TMB | 60% TEOS | 68A, 76O | 47A, 61O | 39A, 55O |
| 31 | 50% TMB | 60% TEOS | 68A, 75O | 49A, 60O | 43A, 55O |
| 32 | 60% TMB | 70% TEOS | 66A, 72O | 52A, 58O | 47A, 54O |

After curing and dry at 63° C. in the dehydrator for several days, these samples were highly viscoelastic and had the firmnesses listed in Table 4. These data show that the Shore Hardnesses of these viscoelastic siloxane rubber compositions, according to the invention, decrease with increasing time.

Example 33

Passivation of a VSR with TEOS and AMA Solutions 12.5 wt % G1958 was dispersed in 90-120 cSt STPDMS using an immersion blender. This blend was then heat-treated as a thin layer on an aluminum surface for 5 minutes at 180° C. The resulting blend was extremely viscous and thixotropic.

To 98.938 g of this blend, 0.726 g TMB (60% Saturation), 1.759 g AMA (2 wt %), and 01.309 g TEOS (60% Saturation) were added. 30 g of this mixture was placed in a 6"x4" plastic bag and degassed in vacuum. The bag was sealed, pressed flat, and allowed to cure for 24 hours in the dehydrator at 63° C. The material became highly viscoelastic and of medium firmness.

Two passivating liquids were prepared. In passivating liquid A, 2.000 g of toluene, 0.200 g of TEOS, and 0.200 g of AMA were combined. In passivating liquid B, 2.200 g of 10 cSt PDMS, 0.220 g of TEOS, and 0.220 g of AMA were combined to obtain a passivating liquid. Using a small paintbrush, a thin layer of passivating liquid A was spread onto one quadrant of the viscoelastic silicone rubber sheet. That procedure was repeated for passivating liquid B. The sheet was then placed in the dehydrator at 63° C. for 30 minutes.

The two painted quadrants were indeed passivated. They showed no tendency to stick to themselves or to other viscoelastic silicone rubbers. The two remaining (untreated) quadrants did stick to themselves and to other unpassivated viscoelastic silicone rubbers when the surfaces were pressed against one another.

The invention claimed is:

1. A method of making a viscoelastic silicone rubber composition comprising the steps of:
    reacting a silanol-terminated polyorganosiloxane base with a boron-containing crosslinking agent under conditions to produce a borosilicone compound,
    adding a siloxane bond-forming crosslinking agent, a catalyst, an optional filler, and an optional foaming agent to the borosilicone compound to form a mixture; and
    curing the mixture under conditions sufficient to form a viscoelastic silicone rubber composition,
    wherein the boron-containing crosslinking agent is added in an amount up to 100% saturation.

2. The method of claim 1, further comprising the step of:
    mixing the silanol-terminated polyorganosiloxane base with a filler prior to reaction with a boron-containing crosslinking agent.

3. The method of claim 1, further comprising, prior to or during the curing step, the steps of:
    injecting a pressurized gas into the mixture; and
    releasing the pressure to form a foamed viscoelastic silicone rubber composition.

4. The method of claim 1, further comprising, prior to the curing step, the step of:
    placing the mixture in a mold.

5. A method of making a viscoelastic silicone rubber composition comprising the steps of:
    combining a silanol-terminated polyorganosiloxane base with a siloxane bond-forming crosslinking agent, a catalyst, an optional filler, and an optional foaming agent to form a mixture;
    adding a boron-containing crosslinking agent to the mixture; and
    curing the mixture under conditions sufficient to form a viscoelastic silicone rubber composition,
    wherein the boron-containing crosslinking agent is added in an amount up to 100% saturation.

6. The method of claim 5, further comprising the step of:
    mixing the silanol-terminated polyorganosiloxane base with a filler prior to the combining step.

7. The method of claim 5, further comprising, prior to or during the curing step, the steps of:
    injecting a pressurized gas into the mixture; and
    releasing the pressure to form a foamed viscoelastic silicone rubber composition.

8. The method of claim 5, further comprising, prior to the curing step, the step of:
    placing the mixture in a mold.

* * * * *